July 2, 1935.  H. MJOLSNESS  2,006,867
GRAIN CLEANER AND SEPARATOR
Filed July 19, 1930   6 Sheets-Sheet 3
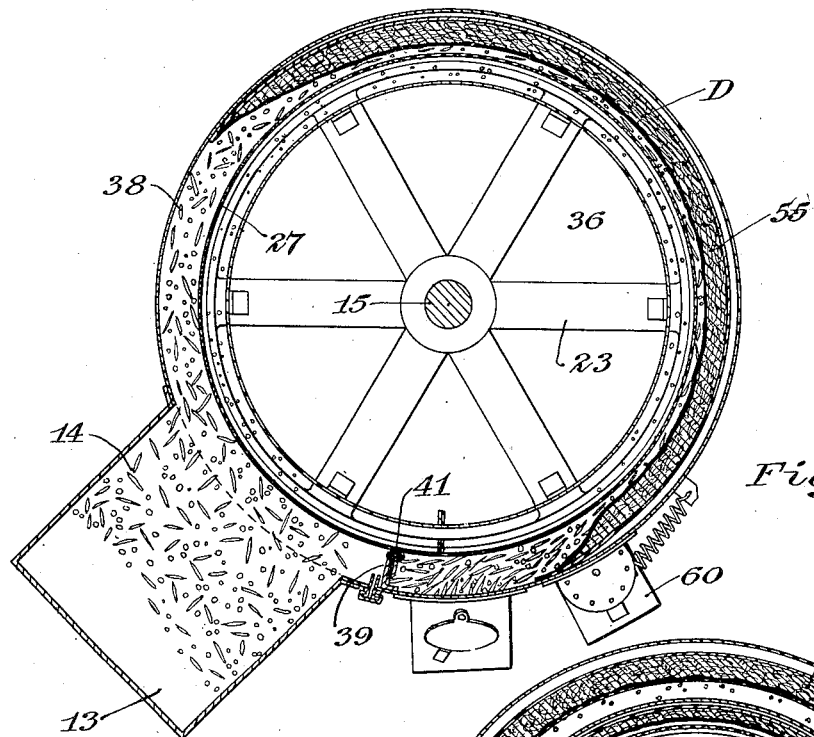
Fig. 3
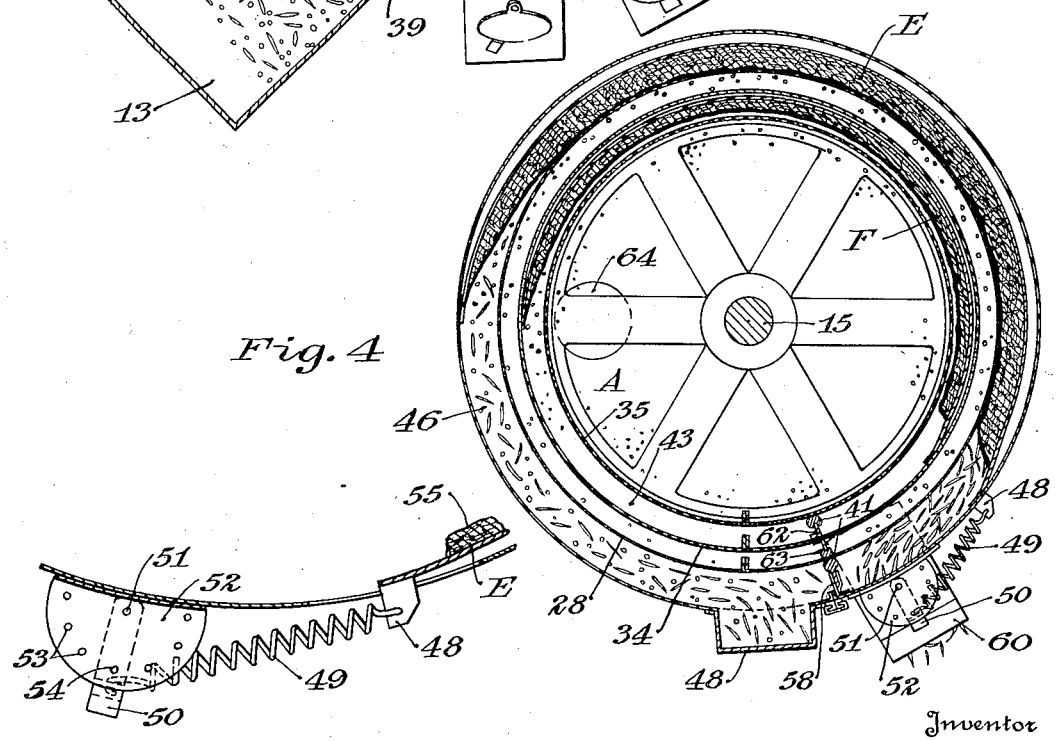
Fig. 4
Fig. 5
Inventor
Haakon Mjolsness
By Howard Fischer
Attorney July 2, 1935. H. MJOLSNESS 2,006,867
GRAIN CLEANER AND SEPARATOR
Filed July 19, 1930  6 Sheets-Sheet 4
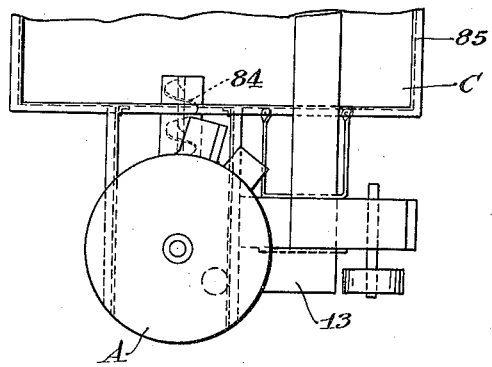
Fig. 6
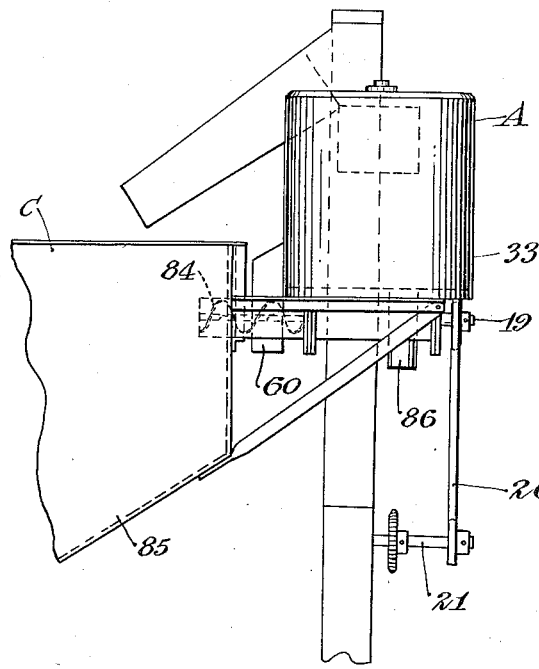 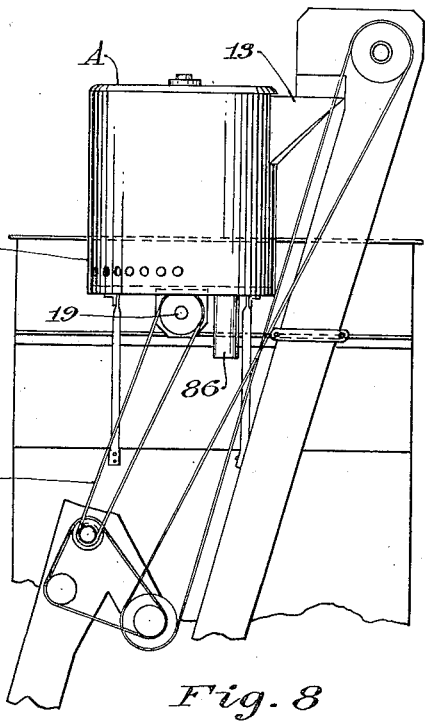
Fig. 7    Fig. 8
Inventor
Haakon Mjolsness
By *[signature]*
Attorney July 2, 1935.  H. MJOLSNESS  2,006,867
GRAIN CLEANER AND SEPARATOR
Filed July 19, 1930   6 Sheets-Sheet 5
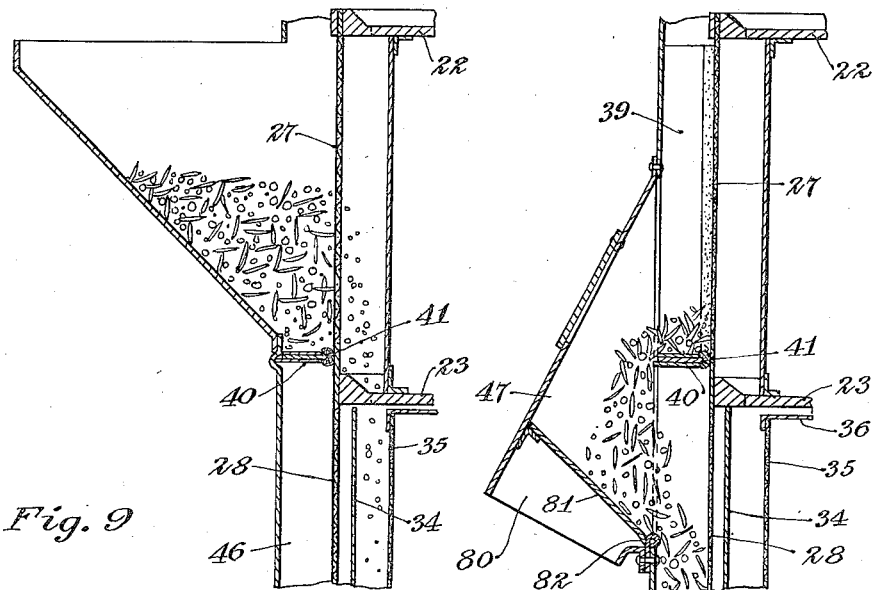
Fig. 9
Fig. 10
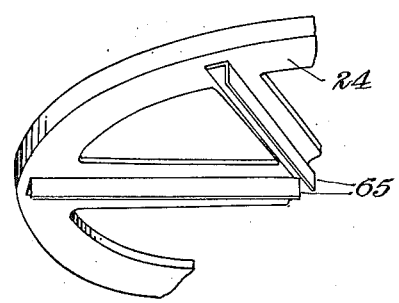
Fig. 12
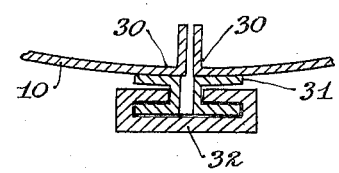
Fig. 11
Inventor
Haakon Mjolsness
By
Attorney Inventor
Haakon Mjolsness
By Howard Riche
Attorney Patented July 2, 1935

2,006,867

UNITED STATES PATENT OFFICE 2,006,867

GRAIN CLEANER AND SEPARATOR

Haakon Mjolsness, Minneapolis, Minn., assignor to Haaky Manufacturing Company, St. Paul, Minn., a corporation of Minnesota Application July 19, 1930, Serial No. 469,017

20 Claims. (Cl. 209—266)

This invention relates to a grain cleaner and separator designed to accomplish certain results which have heretofore been of a difficult nature, particularly where a separator is desired to operate with a combine in the field in the threshing of grain and where it is desirable to separate the grains so that the wheat may be separated from the oats, or wheat from the barley, or the grain from other seeds, or the grain may be separated in its various sizes. This combine is designed to operate readily even when tipped from side to side or in operation at various speeds, accomplishing the results desired in virtually perfect separation of the different grains and cleaning the same as they are separated.

A feature resides in providing a separator adapted to receive the grain after it comes from the combine or thresher and carry the same against the separating screens. The separator may be operated at various speeds without affecting the separating operation owing to the structure of the separator which is designed to carry the grain about the separating screen causing some of the same to pass through the screen, while other of the grain is carried on to a port where it is discharged into another compartment and again recleaning and separating so as to thoroughly and completely separate and clean the grain in passing through the separator.

The rotary vertically disposed separating screens operate in my separator in a manner to carry the grain around in virtually a vertically disposed cylindrical-like plane causing the longer grain like oats, barley and the like, to be drawn around by the rotating separating screens, while the wheat, seeds, and smaller grains having a more or less of a spherical nature, are rolled around and carried through the screen into different compartments, being caused to come in contact again and again with the vertically disposed rotating screens until the grain is thoroughly cleaned and separated.

The invention includes a cushioning compensating means for holding the grain in contact with the cleaning and separating screens in the operation of the separator of a peculiar type, particularly adapted to accomplish very desirable results. Heretofore it has been virtually impossible to separate grain without operating the cylinders of the separator at certain speeds. By even slight changes in the speed of former separators they would not work properly and therefore would fail to accomplish the desired results. By the peculiar construction and nature of my separator and cleaner, a variation in the operating speed does not affect the efficiency of the separator in the separating of the grains so that I accomplish a very desirable result in a simple and effective manner, overcoming the difficulties which have confronted different types of grain separators heretofore.

A feature of the separator resides in an adjustable blanket-like cushioning member which wraps about the separating and cleaning screens to hold the kernels of grain in contact with the screen. This blanket-like member may be made of any suitable material. I have found that sheep skin with the wool thereon provides a very practical means of accomplishing the desired results. Other material may be used. The blanket-like member of the separator may be in the form of a brush. The separator may be provided with any number of screens and any number of blanket or compensating cushion members extending about the screens which may be adjustable to apply more or less pressure toward the screen to force the grain and seeds to the screen and also automatically adjustable to compensate for the more or less grain between the blanket cushioning member and the screen in the operation of the separator.

My separator may be applicable in the separation and cleaning, together with the recleaning of grains for threshing machines, elevators, and wherever it is desirable to clean and separate the grains and small seeds from the larger grains. In elevators and mills where grain is separated and cleaned my separator is particularly adapted to accomplish desirable results owing to the large capacity of my separator in proportion to the size of the separator and by virtue of its simple operation, together with a peculiar arrangement of the parts to accomplish the results desired.

It is also a feature of my separator to provide a separating screen of a peculiar nature, designed to provide pocket-like portions together with openings in the pockets through which some of the grain and seeds may pass. The construction of my screen is of primary importance, together with the fact that the screen rotates and acts as a means of drawing the grain around in the separator, while some of the grain rolls in and out of the pockets. This peculiar form of screen co-operating with the blanket or cushioning member provides a separator adapted to thoroughly and completely separate the grain under virtually all conditions and without variation even though the speed of rotation or operation of the separator varies. These are important features as I believe they accomplish a result which has been long desired and not readily accomplished by devices or separators heretofore.

The vertical operation of my separator permits the same to be applicable to combines and threshing machines and also to be easily set up and operated in grain elevators and flour mills or to be used by the farmer in the separation of grain. This vertical rotary operation minimizes the vibration as well as simplifies the operation of the separator.

The various features having been defined, however, further objects and advantages together with the detail construction of my separator will be more fully and clearly set forth.

In the drawings forming part of this specification:

Figure 3 is a section on the line 3—3 of Figure 2.

Figure 4 is a section on the line 4—4 of Figure 2.

Figure 5 is an enlarged detail of a portion of the separator.

Figure 6 is a plan view of the separator, showing the same attached to a combine.

Figure 7 is a side elevation of the separator attachment illustrated in Figure 6.

Figure 8 is an end view of Figure 7.

Figure 9 is a cross sectional detail of a portion of the separator.

Figure 10 is a cross sectional detail of a portion of the separator.

Figure 11 is an enlarged cross sectional detail of a portion of the separator.

Figure 12 is a perspective of a detailed portion of a separator.

Figure 1:
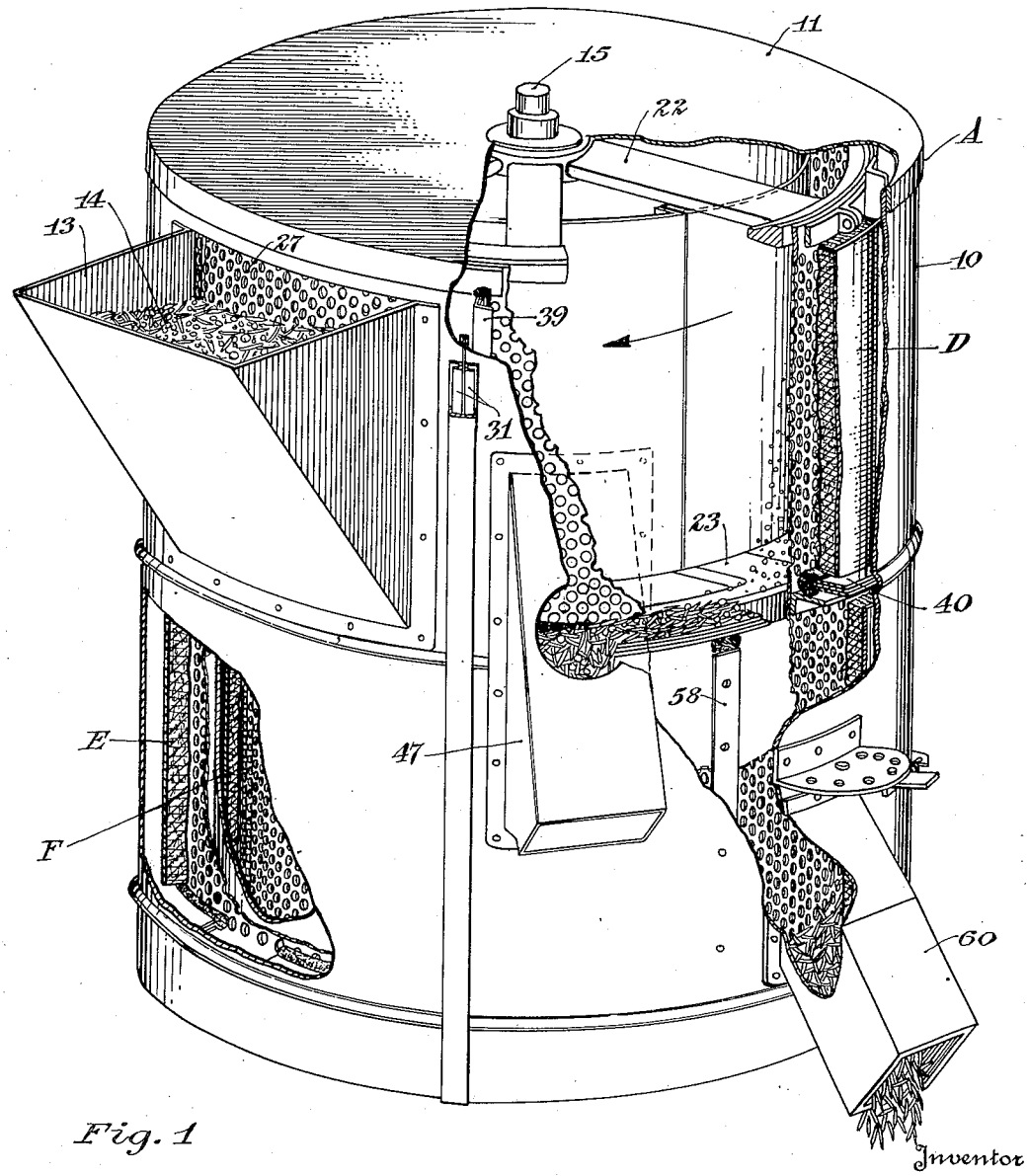
Figure 1 is a perspective view of my vertical rotary separator.

The separator A is a vertical rotary construction with a casing 10, a cover 11, and a bottom 12.

The separator A is provided with a grain receiving hopper 13 into which the grain 14 is fed. The hopper 13 feeds the separator A and directs the grain to the separating and cleaning screens.

I provide an axially disposed operating shaft 15 which is mounted in the bearings 16 and adapted to be rotated by the gear 17 which is connected with a beveled gear 18. The gear 18 may be operated by a horizontal shaft 19. When the separator A is connected to a combine or threshing machine, such as C, only a portion of which is illustrated in the drawings, the shaft 19 may be driven by the belt 20 from any suitable countershaft such as 21 of the machine C. Obviously the separator A may be operated in any suitable manner to rotate the shaft 15.

Figure 2:
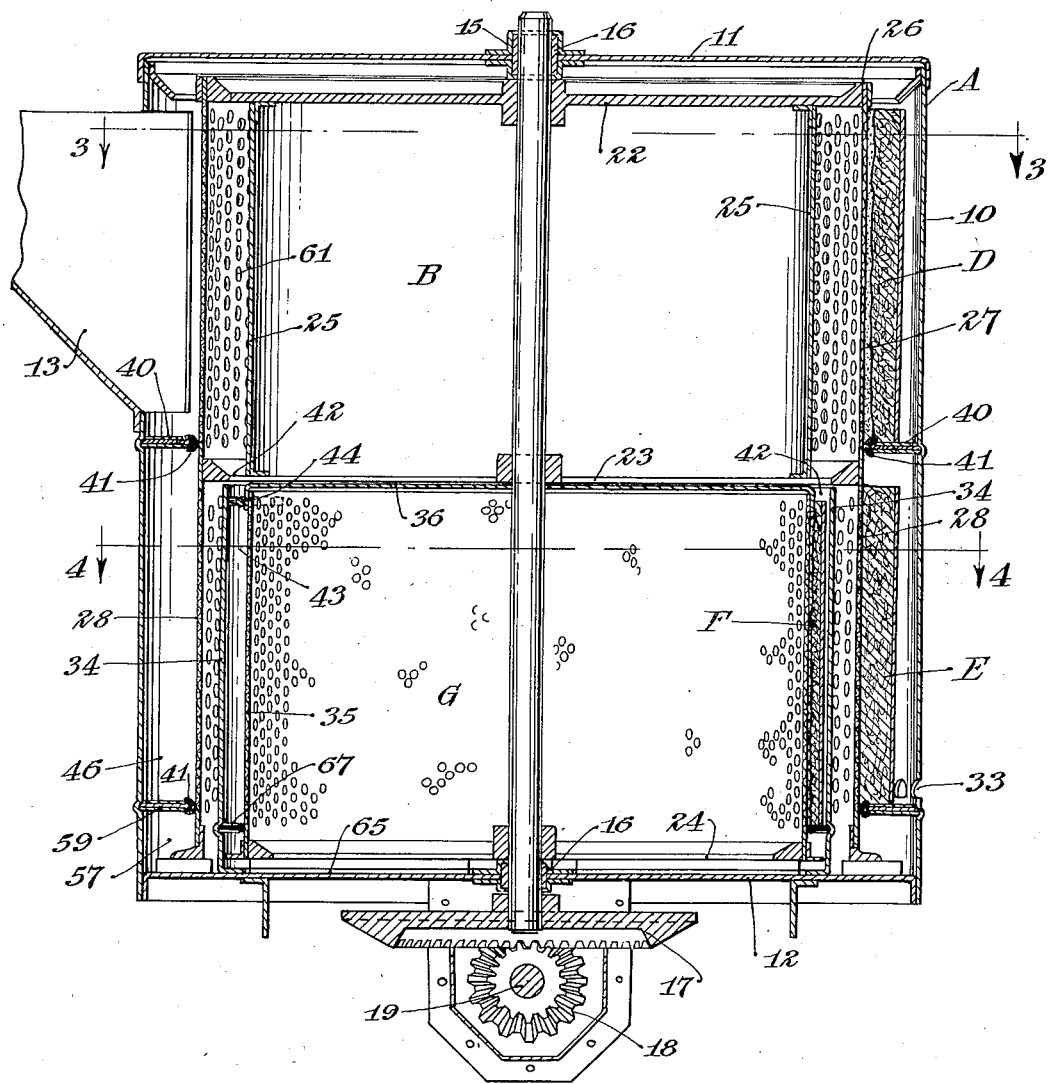
Figure 2 is a vertical cross section of the same.
Figure 13:
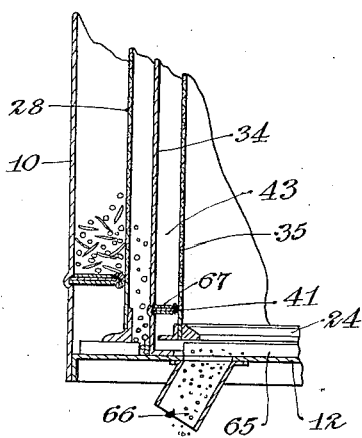
Figure 13 is a detail section of a portion of the separator.
Figure 14:
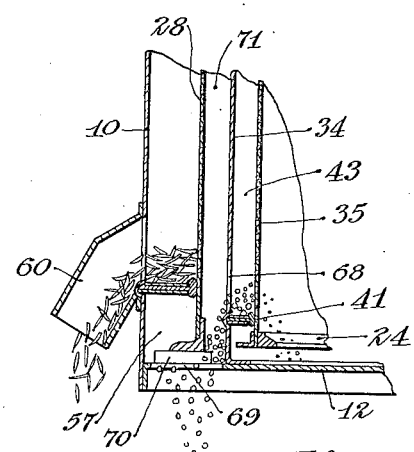
Figure 14 is a section of a portion of the separator.
Figure 15:
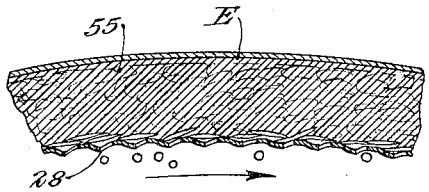
Figure 15 is a detail section of the blanket and screen.

The shaft 15 supports the operating spider wheels 22, 23, and 24 within the casing 10. A baffle cylinder 25 is supported between the wheels 22 and 23 as illustrated in Figure 2 and spaced from the baffle 25 I provide a perforated pocket screen 26 which may be carried by the periphery of the wheels 22 and 23 and which may extend from the wheel 23 down to a point adjacent the bottom 12, so that the screen 26 may be a single member of a cylindrical nature, vertically disposed and adapted to be operated to rotate when the shaft 15 is operated. The upper pocket perforate portion 27 extending between the wheels 22 and 23 may constitute one screen, while the lower portion 28 depending below the wheel 23 to the bottom 12 constitutes a second screen portion and the pocket and openings of these portions may vary in size or may be of the same dimension. The two screen portions 27 and 28 operate together but function separately as screens, as will be hereinafter described. The screens 27 and 28 when formed of a single piece extend in a cylindrical formation about the wheels 22 and 23 and operate together by the rotation of the shaft 15.

The outer casing 10 is joined together to form a cylindrical body with the ends 30 bent inwardly and secured to the channels 31 which project along the outside of the casing. The channels 31 are adapted to be engaged by the channel member 32 which locks the ends 30 together to provide the outer cylindrical casing for the separator A. The bottom 12 is secured to the casing in any suitable manner while the cover 11 is also held in a suitable manner to close the top of the casing of the separator A. Ventilating or dust holes 33 are formed around in the side wall 10 of the casing spaced from the bottom in a manner to permit any dust or dirt which may enter into this portion of the casing to be discharged without interfering with the operation of the working parts within the casing.

When it is desired to open the separator A this may be easily accomplished by sliding the channel member 32 off of the channels 31 and by disengaging the cover 11 and the bottom 12 the entire separator will open up very easily.

In the lower portion of the separator A I provide a cylindrical vertical baffle cylinder 34 just inside of the screen 28 which is supported by and projects upwardly from the bottom 12 so as to hold the same stationary within the casing 10 positioned just inside the separating screen portion 28. This baffle 34 is spaced sufficiently from the separating screen 28 to provide a passageway for grain which passes through the screen 28 so that the grain passing therethrough may drop on to the bottom 12.

Just inside of the cylindrical baffle 34 I provide a separating screen 35 which is carried by and extends from the spider wheel 24 up to the horizontally disposed partition 36 which separates the upper part B from the lower part C of the separator A. The partition wall 36 which is of a disc-like nature is formed with an outer depending flange which supports the upper end of the screen 35. Thus, when the shaft 15 is operated, the screen 35 will rotate in the same manner that the screens 27 and 28 rotate. Each of these screens are rotated together by the operation of the shaft 15. The separating screen 35 is spaced sufficiently from the baffle cylinder 34 to provide a seed or grain receiving passage which extends cylindrically around the screen 35.

The grain 14 is fed into the receiving hopper 13 and comes directly in contact with the screen 27. The rotation of the screen 27 carries the grain 14 toward the cushioning blanket D which extends about in the compartment 38 about the cylindrical screen 27 so as to be extended around a considerable portion of the screen as illustrated in Figure 3. This cushioning blanket may be made of any suitable material and I have found that sheep skin with the wool 55 on the same provides a very practical means of forming the cushioning blanket about the cylinder screen 27. This cushioning blanket D is spaced sufficiently from the screen 27 to permit the grain to be carried around by the screen from the receiving hopper 13 in the direction of travel indicated by the arrows in the drawings.

A wall 39 is formed extending vertically along one side of the grain receiving hopper 13 so as to prevent the grain from running down on this side of the grain receiving hopper. The grain naturally would be carried by the screen 27 toward the direction of travel indicated by the arrow which would be in a direction away from the wall 39. This wall extends the height of the screen 27 to the bottom 40 which extends transversely in the separator A about the same so as to form an annular bottom around the outside of the screen 27. The edge of the wall 39 and the inner edge of the bottom 40 which project toward the screen 27 are covered with a brush-like material such as 41 or packing which may also be of sheep wool, thus forming a flexible packing or joint between the screen 27 and the wall 39 and the bottom 40. This prevents any grain from passing down or to one side as it enters the receiving hopper 13.

The cushion blanket D may be made of a brush-like material of any suitable substance which will act as a cushion and brush to hold the grain entering the passageway 38 which extends annularly about the screen 27 up against the screen as the screen travels about. The cushioning blanket D has a tendency to press the grain toward the screen and hold it in contact with the same. The blanket also assists in holding the grain spread out against the separating screen 27 and in causing the grain to travel virtually completely around the screen. As the screen 27 rotates by the operation of the shaft 15, the grain which is of a nature to pass through the openings in the screen 27, will drop down in a cylindrical-like sheet and pass through the annular passageway 42 extending around the lower edge of the cylindrical baffle wall 25, the spider-like wheel 23 permitting the grain to fall through into the cylindrical-like passageway 43 between the baffle wall 34 and the screen 35. A short transverse floor portion or flange 44 is provided projecting transversely from the side of the baffle wall 34 near the top thereof, which is also provided with a cushioning packing 41 on the edge adjacent the screen 35. This wall 44 prevents the grain from falling directly through beneath the hopper 13 and into the passageway 43. Thus the grain is caused to be carried around with the screen 35 in the direction of rotation of the same, rather than dropping right through down to the bottom of the annular or cylindrical passageway 43 without first being caused to be carried over the cleaning screen 35.

When the grain is carried in from the hopper 13, the small seeds and other grains such as wheat, and grain having a similar spherical nature, will be rolled around on the screen 27 and caused to pass through the same, passing out through the passageway 42 in a cylindrical sheet-like formation down into the annular passageway 43 about the screen 35. The grain of a longer nature such as oats, barley, and similar grain having an elongated shape, will be carried by the screen 27 around the same and to a point almost entirely about the screen 27 and adjacent the wall 39, as illustrated in Figure 3, where it is passed through the opening 47' out into the chute 47 and down into the lower annular grain receiving compartment 46, as illustrated in Figure 10. If any of the wheat has not been carried through the screen 27 in the upper cleaning and separating of the grain in the portion B of the separator A, it will be carried around with the oats and passed through the chute 47 which projects from the side of the separator A permitting the wheat and oats that remain together, to pass through the passageway 48 down into the passageway 46 where the cleaning and separating process is again repeated by the carrying of the grain around and against the screen 28.

About the screen 28 another blanket cushion E is positioned. This cushion E is held adjustable on one end by the arm 48 which connects with the spring 49. The spring 49 is connected to the adjustable arm 50 and the arm 50 is pivoted at 51 in the quadrant 52. A series of openings 53 in the quadrant 52 permit a suitable pin 54 to hold the arm 50 in different adjusted positions so as to cause the spring 49 to draw more or less against the end of the cushion blanket E. The cushion blanket E may be made of any suitable material, such as sheep skin with the wool 55 which bears against the screen 28.

The cushion blanket D may be positioned as illustrated in Figure 3 spaced in a manner so as to permit the grain to readily pass between the wool or brush-like body 55 and the screen 27.

The ends of the cushion blanket D may be fixed or adjustable to increase or decrease the space between the blanket D and the screen 27 and to cause more or less pressure of the blanket against the screen in the same manner as illustrated for the blanket E. In the blanket D the ends may be fixed in a permanent position so that the blanket is in a fixed position if it is desired, like as is illustrated in Figure 3.

The blanket E has the same brush-like wool fibre portion 55 which bears against the screen 28. In the positioning of the blanket E one end is fixed to the side of the separator while the other end is held adjustable by the arm 48. Each of the views 3 and 4 diagrammatically illustrate the general construction and arrangement of the parts, it being obvious that suitable attaching means may be provided for the ends of the cushion D.

In the operation of the separator A, the grain which passes through the screen 27 is carried from the compartment 61 through the opening 42 to the compartment 43 in the lower portion G of the separator, while the oats and wheat which still remain together and are carried around by the screen 27 to the chute 47 pass to the lower screen 28 and here the kernels of grain are again brought in contact with the screen such as 28, which may be similar to the screen 27, and the remaining wheat which is with the oats will be caused to pass through the screen 28 and carried into the lower wheat receiving compartment 57 in the bottom of the separator A extending about the lower end of the screen 28. A suitable vertical wall 58 extends alongside of the chute 47 in a similar manner to the wall 39 and the edge of this wall projecting toward the screen 28 is provided with the same packing or flexible brush-like contact 41 which engages with the screen 28 to provide a grain tight joint and to prevent any of the grain running from the chute directly through to the lower part of the compartment 46 before the grain has been carried around the screen 28. As the grain is carried around the screen 28 from the chute 47, it will be caused to be spread out and pass in a thin layer between the cushion blanket or brush E and the screen 28. The tension of the blanket E is regulated automatically by the spring 49 so as to compensate for more or less grain over the screen 28 and to direct sufficient pressure by the blanket brush E toward the screen 28 to cause all of the wheat or similar kernels of grain to be passed through the screen 28 before the grain reaches the discharge chute 60 which is positioned adjacent the wall 58 in the lower part of the separator A. It will be noted by Figure 4, that after the grain is passed beneath the blanket E over the screen 28, all of the long kerneled grain, such as oats, rye, and the like, will be virtually the only grain that will be left in the compartment 46. The lower part of the compartment 46 is provided with a transverse wall or floor 59, which is also provided with the filler or packing 41 so as to provide a grain tight joint between the inner edge of the wall or floor 59 and the screen 28.

In the operation of the separator A after the grain has traveled about the screen 28, the oats and rye, or long grains of this same nature, will be carried to the discharge chute 60, illustrated in Figures 1, 3, 4 and 14. This chute carries the oats or longer grains out of the separator virtually clean of any other grains.

The wheat and small seeds which pass through the screen 27 pass out through the annular opening 42 from the upper compartment 61, which extends annularly around the cylindrical baffle 25 and from this compartment, the seeds and wheat or grain of a similar nature, fall through the opening 42 in a cylindrical-like nature down into the compartment 43, which is also of an annular ring-like nature within the cylindrical baffle 34. The grain and seeds passing down into this compartment 43 are carried around against the screen 35. A suitable vertically disposed wall 62 is formed in this compartment. This wall 62 is of a similar nature to the walls 39 and 58. The wall 62 prevents the kernels of grain from passing directly through the discharge side of the compartment 43. The edge of this wall next to the screen 35 is formed also with a packing or filler 41 which is made of a brush-like nature, flexible so as to engage with the screen 35 to form a grain tight joint and the same as the packing or flexible joint used on the other vertical walls to permit the screens to rotate freely. In line with the wall 62 another vertical wall 63 of a similar nature is provided between the baffle 34 and the screen 28. These vertical walls prevent the grain from passing to the discharge side of the annular or cylindrical-like grain compartment in the separator. The grain is ordinarily carried from these vertical closure walls, such as 39, 58, 62 and 63, when the separating screens are rotated, however, when the screens slow down in operation or stop, the grain might pack toward the discharge side of the respective grain compartments and these vertical walls prevent this and cause the grain to be carried about the separating screen before it can be discharged out of the separator.

As the grain passes into the compartment 43 and is carried about the screen 35, it is caused to pass under an inner cushion blanket F which is attached to the baffle wall 34. The cushion blanket F functions the same as the cushion blanket D, and while the same is not shown adjustable, it is obvious that the blanket F or the blanket D may be adjustable by providing means for drawing the discharge end of the blanket more closely around the screen against which it is operating.

The small seeds and smaller wheat will pass out of the compartment 61 through the passageway 42 and into the passageway 43 where it is carried about the screen 35. The screen 35 may be of a smaller mesh so that the small wheat will not pass through the same but the seeds and small or broken particles of grain will be carried into the center of the screen 35. In the bottom 12, a suitable seed discharge opening 64 is provided. The wheel 24 is provided with blades 65 which extend close to the bottom 12 and carry the seeds around to the opening 64 and discharge the same out through the chute 66 which projects from the bottom 12 of the separator A. The wheat in the compartment 43, which is carried around under the blanket F, is prevented from passing through the compartment 43 by the transverse floor wall 67, the inner edge of which is provided with a packing 41 to form a tight joint against the screen. When the wheat passes around this floor wall 67 to the discharge side of the compartment 43, it is caused to pass out of the opening 68 in the baffle wall 34 into the wheat compartment 57 illustrated particularly in Figure 14. From the compartment 57, the wheat passes out through the openings 69. Suitable blades 70 are carried by the lower end of the screen 28 which spreads the wheat out of the wheat compartment 57 as the screen 28 rotates. Small wheat and large wheat may be mixed together in the compartment 57, the larger wheat coming through the screen 28 and passing into the compartment 71 which is formed between the screen 28 and the baffle wall 34. In this manner the wheat or elongated grain is separated from the wheat, and the small seeds are separated from the wheat and oats, thereby giving a complete separation of the principal grains, such as wheat, oats, and barley, and small seeds or other similar grains.

Figure 16:
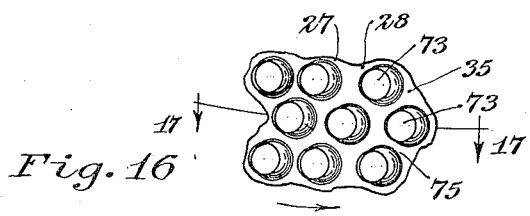
Figure 16 illustrates a portion of the screen of the separator.
Figure 17:
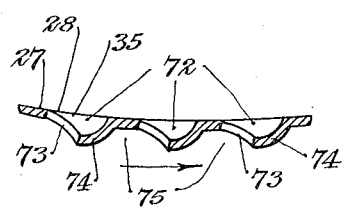
Figure 17 is a section on the line 17—17 of Figure 16.

An enlarged detail of the screens 27 and 28 is illustrated in Figures 16 and 17. This is also a detail of the screen 35 as all of these screens are of the same nature. This separating screen is of a peculiarly different nature than any other screen insofar as I know that has been used heretofore for the separation of grain in a separator. It will be noted that the screen is formed of sheet material which is shaped with a series of adjacently disposed pockets 72 and in one side of these pockets is provided an opening 73 so that each pocket 72 is formed with an opening in one side thereof. This is more clearly illustrated in Figure 17 which shows a section through Figure 16. The pockets 72 may be placed as closely together as desirable or may be spaced farther apart in accordance with the separation desired and the particular grain with which the separator is being used, so that the spacing of the pockets 72 may be varied to provide the kind of a separating screen that is desired. Forming the screens 27, 28 or 35 in this manner, high points 74 are formed on the outside of the pocket-like portion 72. These high points act as guard-like portions to prevent the oats or elongated grain from piercing or threading through the screen, particularly by reason of the fact that the screen rotates in the direction of the arrow in Figures 16 and 17, with the high points 74 acting as a guard for the opening 73 on the outside of the screen. These high points also act as little rake-like members tending to pull to draw the grain around the screen and raking the elongated kernels like oats and barley out in a manner so as to cause these kernels to slide in the furrows in the body of the screen between the pockets of the same while the wheat or spherical-like kernels of grain roll into the recesses 75 and are virtually rolled out through the opening 73 so as to pass through the screen. Each screen 27, 28 and 35 has a similar formation and in the operation of the separator A, these screens rotate around beneath the brush-like blankets D, E, and F, which hold the grain up against the cylindrical screen virtually rolling the spherical-like kernels of grain such as wheat or small seeds in through the opening 73 while the elongated grain such as oats and barley is carried around and separated from the other grain.

The chute 47 is provided with a spout 80 and a wing valve 81 which is hinged at 82 so as to permit the grain being separated to be carried out of the separator by the spout 80 when the wing valve 81 is opened to contact with the edge of the wall 40. In this position the wing valve will cause the grain to pass out of the spout 80 rather than down into the compartment 46. When the wing valve 81 is closed as illustrated in Figure 10, then the grain coming around the screen 27 will pass through the chute 47 down into the lower separating compartment 46 where it may come into contact with the screen 28. In the separation of oats or barley this single separating operation may be sufficient by means of the screen 27 and thus the oats or barley or elongated grain of a similar nature may be carried out through the chute 80. The other grain or seeds passing through the screen 27 can be carried down into the lower compartment 43 and separated as hereinbefore described.

When the separator A is used with a combine or threshing machine such as C, a spiral conveyor 84 may be operated by the shaft 19 to carry the wheat from the discharge opening 69 into the grain tank 85 for the clean wheat. Seeds may pass out through the opening 64 and out through the chute 86 into sacks or other containers while the oats would be discharged out of the chute 60 into suitable containers.

My method of separating and cleaning grain consists in carrying the grain around a rotating cylinder and in pressing the grain toward the cylinder to cause a separation of the grain and the seeds from the grain by some of the grain passing through the rotating cylinder, while other of the grain is carried around and discharged away from the cylinder. This method may include two stages of separation, the primary of which is carried out in the first operation where the seeds and smaller kernels of wheat pass through the first perforated cylinder, while being pressed by suitable means toward the perforate separating cylinder, the oats, barley and elongated grain together with some of the larger kernels of wheat being carried around to a chute which carries the grain to the second stage of separation. In the second separating operation, the grain which is carried around and passes down the chute to the second perforate separating screen or cylinder, is again carried around the perforate cylinder being pressed by suitable blanket brush-like means toward the cylinder and thereby causing all of the wheat or spherical-like kernels of grain to be passed through the openings in the separating cylinder. In this second stage of the separation within the outer larger separating screen the small wheat or spherical kernels of grain are separated from the seeds by passing through a similar separating operation which carries these kernels of grain and seeds against a perforate cylinder having smaller perforations therein and also having a blanket brush for pressing and holding the grain against the separating cylinder. A feature of my method resides in the carrying of the grain around the cylinder as it rotates and by means of the blanket brush about the cylinder which is so positioned as to permit the grain to be fed between the blanket and the perforate separating cylinder, the grain is spread out as it travels around the cylinder until it is virtually in a sheet-like formation over the surface of the perforate cylinder. The perforations of the cylinder are made by projecting pockets with grain openings in one side of the pocket, the high side of the pocket acting as a guard for the openings and this provides furrows or recesses into which the grain, like oats or barley, which is of an elongated nature, will lie, instead of passing through the guarded grain openings in the perforate cylinder and thus be carried around the cylinder. The wheat or other spherical kernels of grain will be caused to roll around and through the openings.

My method is carried out in a simple manner but has an important significance in that it holds and spreads the grain out over the separating cylinder and in a peculiar manner carries the elongated grain around the perforate cylinder without permitting it to pass through the same.

My separator A has the advantage of operation with a combined or threshing machine in that it can take care of a large volume of grain in proportion to its small size so as not to require a large bulky operating device to be attached to the combined or threshing machine and owing to the peculiar efficiency in the separation of grains and seeds by my separator A, it is very desirable for these purposes. The variation of the operating speed of the separating screens will have virtually no effect upon the separating efficiency of my separator A, neither will my separator be materially affected by tilting or tipping from side to side and thus it is very practical for combines. The peculiar construction wherein the grain is carried about a separating cylinder in a manner to be spread out in a thin wall over the separator by the cushioning blanket means provides a novel means of holding the grain in contact with the separating screen, spreading it out over the same and causing the spherical-like grain to be virtually rolled through the openings in the screen, while the elongated kernels of grain are drawn around by the rake-like guarded screen holes.

I have found my vertical rotary separator to operate very efficiently having an extremely large capacity for its compact nature and owing to its simple inexpensive structure it is peculiarly adapted for the separation of grains, not only for combines and threshing machines, but for elevators and mills and as a separator for the farmer to separate and clean the respective grains in a very thorough and efficient manner.

In accordance with the patent statutes I have endeavored to set forth the best embodiment of my grain separator, however, I desire to have it understood that variations to those skilled in the art which are of an obvious nature and apparent from these specifications within the scope of the following claims are of the essence of this invention.

I claim:

1. A grain separator having a series of vertically disposed rotatable perforate cylinders, and cushioning blanket means extending over more than half the circumference of said cylinders for holding the grain in contact with said separating cylinders.

2. A grain separator including, a series of perforate cylindrical cylinders vertically disposed, blanket-like cushion brushes extending over the greater portion of the circumference of said cylinders, and means for adjustably supporting said blankets to cause more or less pressure against the grain carried around said cylinders.

3. A grain separator including, a vertically disposed perforate cylinder having guarded pocket openings formed therein, means for rotating said cylinder with the guards in advance of the openings in the course of rotation, and a compensating blanket about said perforate cylinder adapted to press the grain in a spread-out layer over said perforate cylinder.

4. A grain separator cylinder including, a sheet-like body, a flat surface thereupon, a series of arcuate pockets indented into said body, and a series of openings formed in one side of said pockets, whereby the other side of said pockets is adapted to project from the other side of said body to act as a guard for said openings when said cylinder is rotated in the operation of separating grains.

5. A grain separating cylinder including, a body portion formed of sheet material having a cylindrical nature, a flat inner surface thereupon, pocket indents formed in said body, and openings positioned in one side of said pocket indents with the other side of said pocket indents projecting as a guard to said openings, said pocket indents projecting on the outer face of said cylinder and said guard sides of said pockets acting as grain raking fingers to carry the grain around said cylinder and permitting spherical-like grain to be carried through said holes in said cylinder while elongated grain is caused to lie in the furrows between said projecting pockets on the outer face thereof and be carried around said cylinder in the rotation thereof.

6. A grain separator including, a cylindrical casing, an operating shaft within said casing, a grain receiving hopper in one side of said casing, a perforate grain separating cylinder having a double perforate working surface one side of which is positioned above the other, a separating wall between said perforate cylinders extending about the same, a cylindrical guard within the upper of said perforate cylinder portions, an inner perforate grain separating cylinder positioned within said lower portion of said perforate cylinder, a cylindrical baffle between said outer lower separating cylinder and said inner lower separating cylinder, blanket means about said cylinders to cause grain to be spread out over said cylinders as it is carried thereabout, and passageways adapted to carry the grain from said receiving hopper about and through said cylinders to thoroughly separate and clean the grain and small seeds one from the other.

7. A grain separating cylinder having a vertical rotary nature, a vertical perforate grain separating cylinder having guarded pocket openings, means for operating said cylinder with the guards for the openings in advance rotation of the openings, and blanket cushion means for spreading the grain out and causing it to be pressed against said guarded pocket openings whereby some of the grain passes through said openings, and other of the grain is carried or raked around to separate and clean the grain as it passes through said separator.

8. A grain separator comprising, a series of perforate cylinders, means for rotating said cylinders in unison, an inlet and a discharge outside of each of said cylinders, baffle means for carrying the grain passing through the cylinders into different compartments, baffle walls between said discharges and said inlets, chute means for carrying the grain from one compartment to another, and cushion blankets having the surface thereof pressing toward said perforate cylinders to spread the grain out over said cylinders in a thin layer in a manner to cause some of the grain to pass through the cylinders and other of the grain to be carried around and out of said cylinders, whereby the different grains are thoroughly separated from each other.

9. A grain separator having a vertical rotary nature, a series of vertically disposed rotatable perforate cylinders positioned within said separator, means for rotating said cylinders to carry the grain introduced in said separator about said perforate cylinders, blanket cushion means extending over the greater portion of the circumference of each cylinder having a brush-like operating face adapted to bear towards the perforations of said cylinders to press the grain carried by the cylinders toward the same, causing some of the grain to pass through said perforate cylinders, and interconnecting compartments from one separating cylinder to another, whereby the grains introduced into said separator are discharged out of the same thoroughly cleansed and separated one from the other.

10. A grain separator including, a series of vertically disposed rotatable perforate cylinders, each of the perforations of said cylinders having guard means on one side thereof to prevent long grain like oats and barley threading into the openings of said perforate cylinders during the rotation thereof in the separation of grain, and blanket brushes extending about said cylinders adapted to hold the grain in spread out relation over said cylinders as the grain is carried around in said separator, the spherical-like grain such as wheat and seeds passing through said perforate cylinders and being separated from the elongated grains, such as oats and barley.

11. A grain combine separator comprising, a cylindrical casing, vertically disposed cylindrical perforate grain separating cylinders within said casing, baffle walls bearing against said perforate cylinders to deflect the grain traveling the circumference of said cylinders, compensating blanket-like brush members extending about said perforate cylinders, and means for adjusting said blankets to bear more or less against said perforate cylinders.

12. A grain separator having vertically disposed pocket perforate cylinders positioned one above the other, means for rotating said cylinders in unison, blanket brush members extending about said cylinders, a chute for connecting said upper cylinder with said lower cylinder, a perforate cylinder disposed within said lower cylinder, and a cylindrical baffle wall separating said inner perforate cylinder from said outer lower perforate cylinder to provide two or more grain separations in the passing of grain through said cylinders and carrying the same from one cylinder to the other.

13. A grain separator including, an outer casing, a shaft extending axially in said casing, a perforate grain separating cylinder, wheels carried by said shaft adapted to support said cylinder, said perforate cylinder having an integral formation with an upper and lower perforate portion, adjustable blanket brushes extending about each of said perforate portions, chute means for carrying the grain from said upper perforate cylinder to said lower perforate cylinder, an inner perforate cylinder within the bottom of said first perforate cylinder, a blanket brush about said inner perforate cylinder, the perforations of said inner cylinder having a smaller dimension than said other two perforate portions of said cylinder, and a cylindrically disposed separating wall spaced about said inner perforate cylinder and spaced within said lower perforate cylinder portion.

14. A grain separator including, a series of vertically disposed perforate cylinders, the perforations of said cylinders being formed by indenting the body of said cylinders to form guarded pocket openings extending about said cylinders, brush blankets extending about said cylinders, means for separating said cylinders one from the other to form separate grain receiving compartments for each of said cylinders, and means for operating said cylinders to rotate in unison to cause grain introduced into said separator to be carried around said perforate cylinders beneath said brush blankets and from one cylinder to the other to thoroughly separate one grain from the other and the seeds from the grain.

15. A grain separator including, a cylindrical body casing, a rotatable perforated separating cylinder, a shaft for operating said cylinder, the perforations in said cylinder being divided into different compartments, walls for separating the compartments to provide a primary and secondary cleaning and separating compartment for the grain, and cushion blanket members in each of said compartments about the perforated portions of said cylinder to press and hold the grain in contact with the cylinder regardless of the speed of operation of said operating shaft.

16. A grain separator including, a casing, a cylindrical perforated cylinder, a shaft and wheels for supporting said cylinder, the perforations of said cylinder extending in band-like formation to provide one or more bands of perforations in said cylinder, baffle walls, sides and bottom walls adapted to divide said separator and the several separating compartments for each band of openings in said perforated cylinder, a grain feeding hopper adapted to feed grain to the first band of perforations, passageways for feeding grain to the several other bands of perforations, and cushion-like blanket means for holding the grain spread out over the band-like perforations of said cylinder to cause the kernels of grain to be separated in the rotation of said cylinder.

17. A grain separator including, a series of perforated rotatable cylinders against which the grain is adapted to be spread, blanket cushioning means for spreading the grain against said cylinders, guards for protecting the openings in said cylinders positioned on the advance side of the openings in the rotation of said cylinder, passageways for directing the grain from one to the other of said cylinders to subject the same to a series of cleaning and separating operations, whereby the elongated grain is carried around the cylinders while the spherical-like grain is rolled into and through the openings in said cylinders, the guards for the openings acting as raking means to direct the grain around between the cylinder and said cushioning means.

18. A grain separator including, perforated cylinders, means for rotating said cylinders, rake-like guard members for each of the perforations in said cylinders to tend to rake the grain around the surface of said cylinders and cushion-like blanket means around said cylinders to spread out the grain over said cylinders and force some of the grain to roll through the perforations as the grain is raked around the cylinders, the elongated grain being prevented from passing through the openings in said perforated cylinders by the rake-like guard members.

19. A grain separator for a combine including, cylindrical rotatable separating cylinders, a cascading about said cylinders, and means extending virtually the entire circumference of said cylinders for holding the grain in contact with said cylinders in a manner to cause some of the grain to pass through the cylinders, while other of the grain is carried around virtually the entire circumference of said cylinders and discharged from said separator, irrespective of the speed of rotation of said cylinders or the angle of operation.

20. A grain separator for combines and threshers including, a series of rotatable vertically disposed perforated cylinders having guard means for each perforation, compensating cushion-like blanket means over the greater portion of the circumference of said cylinders for spreading the grain over the perforated surface of said cylinders, passageways for carrying the grain from one to the other of said cylinders to provide a cleaning and recleaning and separating of the grain, a casing for inclosing said cylinders, and means for operating said cylinders to cause the same to rotate, the angle of operation and the speed of rotation of said cylinders being immaterial to the separating efficiency thereof in its operation.

HAAKON MJOLSNESS.